United States Patent [19]

Woudstra

[11] 4,312,703
[45] Jan. 26, 1982

[54] NUCLEAR REACTOR INSTALLATION

[75] Inventor: Nico Woudstra, Gouda, Netherlands

[73] Assignee: B. V. Neratoom, The Hague, Netherlands

[21] Appl. No.: 905,516

[22] Filed: May 12, 1978

[30] Foreign Application Priority Data

May 13, 1977 [NL] Netherlands ............... 5332

[51] Int. Cl.³ ........................................... G21C 15/00
[52] U.S. Cl. .................................... 376/299; 376/402
[58] Field of Search ........................... 176/65, 38, 87; 165/140, 163

[56] References Cited

U.S. PATENT DOCUMENTS

| 2,418,446 | 4/1947 | Anderson | 165/140 |
| 2,541,069 | 2/1951 | Jones | 165/140 |
| 3,153,444 | 10/1964 | Purdy | 176/65 |
| 3,322,640 | 5/1967 | Heathcote | 176/38 |
| 3,656,543 | 4/1972 | Wolowodiuk | 176/65 |
| 3,968,653 | 7/1976 | Cachera | 176/38 |
| 4,098,329 | 7/1978 | Culver | 165/140 |

FOREIGN PATENT DOCUMENTS

| 2621258 | 11/1977 | Fed. Rep. of Germany | 176/38 |
| 51-57049 | 1/1976 | Japan | 176/38 |

OTHER PUBLICATIONS

Goeser, *Primary Heat Transport System and Plant Control*, Proceedings of the Breeder Reactor Corporation, Jan. 1974, Information Sessions on the Clinch River Breeder Reactor Project (1974), at. p. 93.

*Primary Examiner*—Charles T. Jordan
*Assistant Examiner*—Edward F. Miles

[57] ABSTRACT

A nuclear reactor installation comprising a housing including therein a reactor core and provided with means for dissipating the heat generated in the reactor core during operation, which means comprise a primary cooling fluid circuit passing at least one partly through the reactor core in which is included a pump, a secondary cooling fluid circuit arranged outside the housing of the nuclear reactor and consisting of at least one closed loop in which is included a pump, a loop of the primary circuit being coupled by means of a heat exchanger to a loop of the secondary circuit, said installation is also provided with means for dissipating the decay heat produced in the core of the nuclear reactor after the reactor has been switched off, which dissipation means are at least partly formed by the primary cooling fluid circuit. The means for dissipating the decay heat including a third cooling fluid circuit arranged outside the housing of the nuclear reactor and comprising at least one closed loop in which is included a pump, and is coupled to the external portion of the primary circuit by means of the same heat exchanger which couples the primary circuit to the secondary circuit.

1 Claim, 5 Drawing Figures

NUCLEAR REACTOR INSTALLATION

FIELD OF THE INVENTION

The invention relates to a nuclear reactor installation comprising a housing holding a reactor core and provided with means for dissipating the heat generated in the reactor core during operation, which means comprise a primary cooling fluid circuit consisting of at least one loop passing through the reactor core and housing in which is included a pump, as well as a secondary cooling fluid circuit arranged ouside the housing of the nuclear reactor and consisting of at least one closed loop in which is included a pump, the loop of the primary circuit being coupled by means of a heat exchanger to the loop of the secondary circuit, while the installation is furthermore provided with means for dissipating the decay heat which is produced in the core of the nuclear reactor after the reactor has been switched off, which dissipating means are at least partly formed or included within the primary cooling fluid circuit.

BACKGROUND OF THE INVENTION

Like nuclear reactor installations are well-known and comprise both installations of the so-called "loop" type and installations of the so-called "pool" type. As cooling fluid for dissipating heat generated in the reactor core for example, liquid sodium may be used as, for example, in a nuclear reactor of the fast breeder type. The liquid sodium transfers the heat from the primary circuit in the heat exchangers between the loops of the primary circuit and the respective loops of the secondary circuit heat to the fluid in the secondary circuit, which fluid is, for example, also liquid sodium. The heat thus transferred to the secondary circuit is subsequently used, for example, for the conversion of water to steam in one or more steam generators coupled to the secondary circuit for heat transfer.

When the nuclear reactor is suddenly stopped or cut off, the heat production in the core quickly diminishes until it is only a few percent of the nominal power. This last value decreases only gradually in a period which may vary from a few hours to some days. The heat which is still generated in the reactor when it is cut off is called decay heat. Although the decay heat is only a few percent (for example, 1-3%) of the design power of the reactor, the decay heat may be considerable, particularly in recently proposed reactors having a very great design power. If the decay heat is not dissipated from the core, the reactor core will become superheated, with highly undesirable consequences: the stainless steel pins wherein the nuclear fuel is present in the reactor core could, for example, melt locally, resulting in reactions of the nuclear fuel with the sodium of the cooling fluid and the entire primary cooling fluid circuit could be strongly contaminated.

For the dissipation of the decay heat the normal cooling system of the reactor which usually is also employed for the dissipation of the heat generated during operation could serve. Since this manner of dissipation of the decay heat alone is not considered safe enough, extra provisions can be made. In a fast breeder type reactor as now under construction, for example, the decay heat is transferred via the primary circuit to the secondary circuit and thence to the water-steam system. When the reactor is cut off, the pumps of this entire system continue to work slowly for this purpose. As an addition to this system there are also provided immersion coolers which are switched on when the reactor is cut off.

A drawback of the utilization of the entire system of primary circuit, secondary circuit and water-steam system for the dissipation of the decay heat is that the secondary circuit and the water-steam system constitute part of the protective system of the nuclear reactor, as a result of which, beside the usually already set reliability requirements, extremely high safety requirements are set by the authorities. As a result of this, a scaling-up for future nuclear reactors is very difficult from a technical point of view.

Now, the object of invention is to provide a nuclear reactor installation wherein an alternative provision is made for the dissipation of the decay heat, so that the entire system of primary circuit, secondary circuit and water-steam system is not needed for the decay heat dissipation, while nevertheless there is ensured an installation satisfying the highest safety and reliability requirements.

THE INVENTION

According to the invention, the outlined object is achieved with a nuclear reactor installation wherein the means for the dissipation of the decay heat at least consist of another third cooling fluid circuit arranged outside the housing of the nuclear reactor and comprising at least one closed circulating fluid loop in which is included a pump, coupled to an external loop of the primary circuit by means of the same heat exchanger which couples the primary circuit to the secondary circuit.

Therefore, in the installation according to the invention dissipation of decay heat take place via the primary circuit, but the heat is transferred to a separate cooling circuit, to which may be connected one or more air coolers. In addition, there may be provided conventional immersion coolers as a supplementation to the decay heat dissipation via the primary circuit. Essential to the installation according to the invention is that the decay heat cooler (i.e. the heat exchanger between the primary circuit and the third circuit) is completely integrated in the intermediate heat exchanger (i.e. the heat exchanger between the primary circuit and the secondary circuit).

The use according to the invention of a decay heat cooler integrated in the intermediate heat exchanger has a number of advantages. A first advantage is that the component in question is very compact. The integral combination of intermediate heat exchanger and decay heat cooler occupies less space than two separate components. Furthermore there is question of a saving of piping, because no separate loop need be passed from the primary system to the decay heat cooler.

A further advantage of the installation according to the invention is that there is no required increase of the pumping capacity to circulate the cooling fluid in the primary circuit.

In general, in a decay heat cooler all the fluid should run through the cooler, but the cooling surface should be relatively small in order to keep the influence of the decay heat cooler during normal operation as small as possible. For that reason one will perhaps space the tubes widely apart in the cooler. When the rate of the fluid in the primary circuit becomes slight, then, however, the heat transfer situation may become bad. Since this is undesirable a fair pressure drop in the cooler even at low through-flow rates is needed. However, this requires a much higher pressure drop at full load. In the installation according to the invention, thanks to the integrated construction, the tubes of the intermediate heat exchanger provide sufficient mixing, even of slowly flowing fluid from the primary circuit around the relatively widely apart spaced tubes of the decay heat cooler so that a uniform cooling is provided for.

In a highly suitable embodiment of the installation according to the invention, the integrated heat exchanger comprises a vessel-shaped housing having arranged therein a bundle of a plurality of straight tubes almost vertically extending in the housing and arranged around a central tube which projects above and below the housing and terminates in a first collecting chamber, which collecting chamber at the top side is closed by a tube plate wherein terminate the lower ends of part of the tubes of the bundle. The upper ends of the tubes of this part of the bundle terminate in a tube plate which constitutes the lower wall of a second collecting chamber which is provided with a discharge line. The remaining tubes of the tube bundle, which comprise the more outwardly situated tubes of the bundle, at the bottom side terminate into a torus-shaped collecting chamber which is arranged around the first collecting chamber and/or the lower end of the therein terminating tubes, and at the top end terminates into an other torus-shaped collecting chamber which is arranged around the top end of the tubes terminating into the second chamber. The lower torus-shaped collecting chamber is connected a supply line leading to outside the housing and the top torus-shaped collecting chamber is connected to a discharge line also leading to outside the housing. The housing is also provided with a supply line and a discharge line for supplying and discharging, respectively, of primary cooling medium to the space in the housing which is not occupied by the tube bundle, the collecting chambers and the lines and tubes leading thereto or therefrom.

Preferably, in this heat exchanger annular flow baffles are arranged in the space destined for primary cooling medium around the tubes of the tube bundle. The annular flow baffles are in substantially parallel planes which are almost perpendicular to the axis of the central tube, so such that the primary cooling medium moving along the tubes in operation alternately flows along the tubes between the first and second collecting chamber and the tubes between the two torus-shaped collecting chambers. Preferably, the baffles consist of first annular bodies having a diameter at the inside of the ring almost equal to the outer diameter of the central tube and an outer diameter almost equal to the diameter of the envelope of the tubes of the part of the tube bundle between the first and second collecting chamber, and second annular bodies having an inner diameter in the order of twice the outer diameter of the central tube and an outer diameter almost equal to the diameter of the envelope of the entire tube bundle, which first and second annular bodies are arranged alternately and spaced apart from each other.

In such an integrated intermediate heat exchanger and decay heat cooler, throughflow of the intermediate heat exchanger and the decay heat cooler takes place alternately, so that transients during shut down from normal operation to decay heat dissipation are restricted.

An other embodiment of the integrated intermediate heat exchanger and decay heat cooler installation according to the invention comprises a vessel-shaped housing having arranged therein a bundle of a plurality of straight tubes extending almost vertically, which tubes at the bottom and top side terminate into tube plates which close a first collecting chamber situated substantially above the tube bundle and a second collecting chamber situated substantially below the tube bundle. The housing is provided with a supply opening for feeding the primary cooling fluid into the first collecting chamber and with a discharge opening for discharging it from the second collecting chamber. It is supplied thereto from the first collecting chamber via the tubes. The housing is also provided with means for supplying secondary cooling fluid in to the space around the tubes at their lower end and discharging same from the space at the top end. In each tube of the tube bundle there is arranged a concentric second tube which projects outside the tube and is passed through the first and second collecting chamber and at the bottom side terminates into a central supply tube for cooling fluid for decay heat dissipation and at the top side terminates into a tube plate which constitutes a closure for a third collecting chamber. This chamber is provided with a discharge opening for discharging the cooling fluid for dissipating the decay.

In such a design it is necessary to arrange in each tube of the intermediate heat exchanger, a concentric tube for the cooling fluid for decay heat dissipation, since otherwise during decay heat dissipation there may occur great differences in temperature between the tubes among themselves. This would lead to undesirable thermal stresses.

A further embodiment of the integrated heat exchanger to be used in the installation according to the invention comprises a vessel-shaped tube having a tube vertically extending along the axis which projects above the housing and extends into the housing adjacent to the lower end thereof where the tube terminates into a first collecting chamber, as well as having a second vertical tube having a greater inner diameter than the outer diameter of the first-mentioned tube, which second tube is arranged concentrically around the first tube, at the top side projects above the housing and extends into the housing adjacent to the lower end thereof, where the tube terminates into a second collecting chamber. The surrounds the first collecting chamber, which first tube is sealingly passed above the housing through the wall of the second tube and the two tubes are closed at the top side in a suitable manner. Both tubes are provided with a supply opening, which can be connected to respective supply lines, while from the first collecting chamber project a plurality of tube-shaped lines and extend through the second collecting chamber and are passed sealingly through the wall thereof. From the second collecting chamber also project a plurality of tube-shaped lines, which pass from the first chamber and from the second chamber adjacent the chambers through a first supporting plate and are combined to form one single bundle which subsequently extends helically around the central tubes towards the top side of the tube. There the tubes originating from the first collecting chamber terminate via a second supporting plate into a third collecting chamber and the tubes originating from the second collecting chamber terminate via the supporting plate into a fourth collecting chamber, while the supporting plates which are also arranged around the central tubes define a pair of the housing wherein the primary cooling fluid is introduced via a supply opening in the wall of the housing and from which via a discharge opening in the wall the primary cooling fluid can be discharged again, while the third and the fourth collecting chamber are provided with openings for connecting thereto the respective discharge lines.

An advantage of such an integrated heat exchanger having a helically wound tube bundle is the great surface area that is available for heat transfer (from the primary cooling medium via the tube walls to the secondary cooling media), and the proper mixing which can be achieved. That is to say, that the primary cooling medium is distributed homogeneously over the entire space wherein the helically wound bundle is present, so that no great differences in temperature occur across a horizontal cross-section through the heat exchanger. The tubes of the helically wound bundle may extend in superposed layers, wherein in each layer there are present both the tubes of the intermediate heat exchanger and of the decay heat cooler. In this connection the ratio between the number of tubes of the intermediate heat exchanger and the number of tubes of the decay heat cooler depends on the amount of decay heat to be dissipated after the nuclear reactor has been cut off. There has to be taken into account the maximum allowable differences in temperature between the tubes themselves and between the various layers of tubes in the helically wound bundle. An expert in the field of heat exchangers will be able to determine the most favourable numbers.

For the decay heat dissipation system in the installation with a helically wound bundle there are several possibilities. For example, the system can be used for generating electrical energy and for that purpose be connected to a steam generator, just like the secondary system of the intermediate heat exchanger. In that case, the cooling medium in the decay heat cooler can be kept at almost the same temperature as the cooling medium in the intermediate heat exchanger. Differences in temperature between the various tubes can thereby be avoided to a considerable extent. An other possibility is that the cooling medium in the decay heat cooler is not circulated during normal use of the nuclear reactor. Then the temperature profile of this cooling medium over the bundle will be almost equal to that of the primary cooling medium. The differences in temperature occurring with the tubes of the intermediate heat exchanger are acceptable.

In a less favourable alternative, the cooling medium of the decay heat dissipation system is circulated without the heat being transferred. Then on certain positions in the integrated heat exchanger relatively high temperature gradients may exist, so that this alternative is not preferred. Finally, it is possible to circulate the cooling medium in the decay heat dissipation system at a low rate during normal operation of the reactor, and to take heat from the medium by means of an external cooler. By doing so, undesirable temperature gradients are avoided, but the heat dissipation in the external cooler decreases the efficiency of the total reactor installation.

DETAILED DESCRIPTION OF THE INVENTION

In an integrated heat exchanger with helically wound bundle intended for use in a reactor having an output of 5000 MWh, at an output of the intermediate heat exchanger of 625 MWh, and if there is started from an output of the decay heat dissipation corresponding to 5% of the reactor output, that is to say an output of 62.5 MWh for each decay heat cooler, it is possible to attain a proper temperature distribution over the helically wound bundle if it is built up of 26 layers with total of 2197 tubes, 1950 tubes of which constitute part of the intermediate heat exchanger and 247 tubes of the decay heat cooler. The total bundle length in this installation is more than 6 meters. If there is a decay heat dissipation of 2% of the reactor output, there are required 2025 tubes, 1920 of which are in the intermediate heat exchanger and 105 in the decay heat cooler.

The invention will now be explained with reference to the accompanying drawings wherein FIG. 1 diagrammatically shows the nuclear reactor installation according to the invention.

Figure 1:
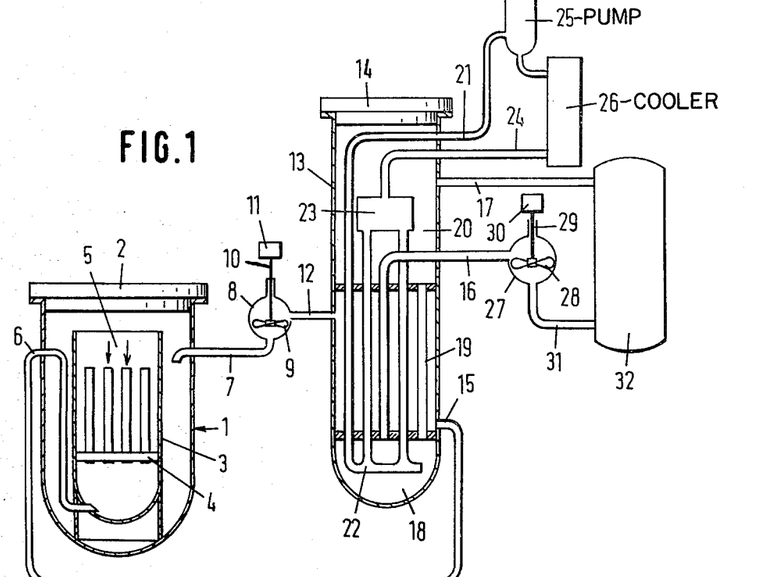

FIG. 1 diagrammatically shows the construction of the nuclear reactor installation having integrated intermediate heat exchanger and decay heat cooler. The nuclear reactor in this entire installation comprises the vessel or housing 1, shut off by cover 2. Cover 2 is provided with bores (not shown) shut off by smaller covers or plugs through which can be admitted apparatus for handling parts present in the interior of the vessel. In the vessel 1 there is arranged an inner vessel 3 containing a supporting plate 4 by which the fuel rods 5 can be supported. Through the wall of the vessel 1 there is passed a line or tube 6 which terminates within the inner vessel 3 underneath supporting plate 4. Through tube 6 is supplied the cooling fluid for cooling the nuclear reactor. Via openings in the supporting plate 4 the cooling fluid flows upwardly along the fuel rods 5. Liquid sodium is commonly employed as cooling fluid, which is introduced in the vessel 1 at a temperature of about 380° C. and which is heated to about 550° C. upon traversing the core. Via the tube or line 7 emerging from the vessel 1, the heated fluid is conducted from the reactor vessel. For circulating the cooling fluid in the pipe system 6,7 serves a pump arranged in the pump housing 8. The pump blades 9 (impeller) are driven via the drive shaft 10 by motor 11. The cooling fluid drawn in by the pump from the reactor vessel 1 via line 7 is transported via line 12 to the integrated intermediate heat exchanger and decay heat cooler, from which component the housing of vessel 13 is shut off by cover 14.

Within the vessel 13 the hot cooling fluid flows around tubes 19, through which tubes is flowing secondary cooling fluid. The secondary cooling fluid has a lower temperature than the primary cooling fluid originating from the reactor core. During the flowing around the tubes the primary cooling fluid therefore emits heat to the secondary cooling fluid, so that primary cooling fluid with a lower temperature leaves the vessel 13 via the discharge line 15. As shown, the discharge line 15 is the same line which as line 6 reenters vessel 1 of the nuclear reactor.

The secondary cooling fluid is supplied in the integrated intermediate heat exchanger and decay heat cooler via line 16, which terminates in the collecting chamber 18 via a tube extending centrally in the vessel 13. From there the secondary cooling fluid, usually comprising liquid sodium, is conducted via some of tubes 19 towards the collecting chamber 20, from which position the secondary cooling fluid is heated in this passage through the heat exchanger by the primary cooling fluid and is discharged via a discharge line 17. Circulation of the cooling fluid in the secondary circuit is provided by pump 27. The pump blades (impeller) 28 are driven through a drive shaft 29 by motor 30. The secondary cooling fluid discharged from the intermediate heat exchanger is conducted to steam generator 32. Such a steam generator has a construction known to the worker in the art, which does not need further explanation. In the steam generator the heat from the secondary cooling fluid is utilized for converting water into steam. The secondary cooling fluid cooled thereby is drawn in via a line 31 by pump 27, 28 and returned to the intermediate heat exchanger.

Essential for the nuclear reactor installation according to the invention is the integration of the decay heat cooler and the intermediate heat exchanger. The decay heat cooler is thereby a separate or third cooling fluid circuit. Via line 21 the cooling fluid is conducted in the vessel 13 where the fluid arrives in the collecting chamber 22. From there the fluid, via those tubes 19 which are not employed for transport of secondary fluid of the intermediate heat exchanger, is conducted to the collecting chamber 23 from where the fluid is discharged via line 24 to the cooler component 26. For pump 25 is used for circulating the cooling fluid in the decay heat discharge circuit. The component 26 may be an air cooler or it is also a steam generator operated by means of the fluid circulating in the decay heat discharge circuit.

The integrated decay heat cooler and intermediate heat exxchanger according to the invention may have a very compact construction, which provides a considerable economy in space as compared with the hitherto utilized constructions, wherein the decay heat cooler is incorporated as separate heat exchanger in the primary circuit (before of after the intermediate heat exchanger) or wherein a separate loop of the primary circuit leads to the heat exchanger serving as decay heat cooler. Furthermore it is of relevance in the construction according to the invention that the cold ends of decay heat cooler and intermediate heat exchanger substantially coincide and that the hot ends of both components also substantially coincide. As a result, thermal shock is largely avoided upon transition from full operation to decay heat discharge.

Figure 2:
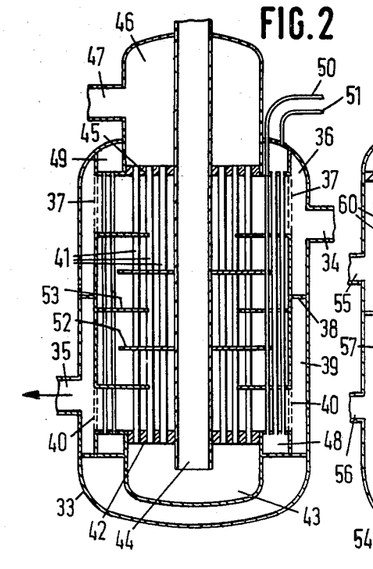
FIG. 2 is a representation of an embodiment of the integrated intermediate heat exchanger and decay heat cooler according to the invention provided with a bundle of straight tubes.

A suitable embodiment of the integrated decay heat cooler and intermediate heat exchanger component according to the invention is diagrammatically shown in FIG. 2. The vessel or housing 33 of the component is provided with a supply line 34 for feeding primary, hot cooling fluid and with a discharge line 35 for discharging the primary cooling fluid reduced in temperature in the component. The supply line 34 terminates in the annular chamber 36 extending along the outer portion at the top of the component. The chamber 36 is shut off at the bottom by means of the baffle 38 (having the shape of an annular plate). The baffle 38 forms the upper boundary of a likewise annular chamber 39 with which the discharge line 35 communicates. In the top of the inner wall of the chamber 36 there are provided openings 37 via which the primary cooling fluid may enter the interior of the component. Via openings 40 in the bottom of the inner wall of the chamber 39, the primary fluid from the interior of the component may flow into the chamber 39. In the interior of the component extend the straight tubes 41, through which tubes is conducted the secondary cooling fluid. Those tubes 41, in close proximity to the central shaft of the component, form part of the intermediate heat exchanger, while the remaining, more outwardly positioned tubes 41, constitutes a part of the decay heat cooler. The tubes 41 of the intermediate heat exchanger, at the lower end, terminate in the tube plate 42, constituting the boundary between the interior of the component, where the primary cooling fluid is present and the collecting chamber 43 for the secondary cooling fluid disposed at the bottom of the component. The secondary fluid is supplied in the collecting chamber via the central tube 44, which, extending from the top of the component along the central shaft, projects into the collecting chamber 43. The top ends of the tubes 41 of the intermediate heat exchanger extend into the tube plate 45 separating the space of the primary cooling fluid from the collecting chamber 46 from which chamber there extends a discharge line 47 to outside the component.

The tubes 41 forming part of the decay heat cooler terminate at the lower end via a suitable tube plate in the torus-shaped collecting chamber 48. The torus-shaped collecting chamber 48 may be arranged around the lower end of the tube 41 of the intermediate heat exchanger, around the top end of the collecting chamber 43 or half-way around both. At the top end the restrictive tubes 41 terminate via tube plates in the torus-shaped collecting chamber 49, which may be arranged around the top end of the remaining part of the tube bundle, around the lower end of the collecting chamber 46 or half-way around both. The cooling fluid for the decay heat cooler is supplied in the collecting chamber 48 via the supply line 50 and discharged from the collecting chamber 49 via discharge line 51.

In order to achieve a proper flow around all tubes 41 of the bundle by the primary cooling fluid, there are provided in the interior of the component a plurality of annular baffles 52 and 53, only some of which are represented in the drawing. The baffles 53 are such that they adjoin with their outer circumference the outer wall of the inner portion of the component, while the inner circumference extends substantially halfway the distance of the outer wall of the central tube 44 and the outer tubes 41 which form part yet of the intermediate heat exchanger. The baffles 52 adjoin with their inner circumference the central tube 44, while their outer circumference substantially coincides with their imaginary outer circumference of the part of the pipe bundle constituting part of the intermediate heat exchanger. The baffles 52 and 53 are arranged alternately. Due to this construction the primary cooling fluid entering the interior of the component via openings 37 in the inner wall of the annular chamber 36, moves to close proximity of the central tube 44, from where the fluid again moves substantially radially outwardly to adjacent the outer wall of the interior part and from there again radially inwardly. During this zigzag passage through the interior, there is an alternate flow both around the tubes 41 of the intermediate heat exchanger and around the tubes 41 of the decay heat cooler. This is favourable for a proper operation at full load as well as for a proper decay heat discharge after cutting off of the nuclear reactor.

Figure 3:
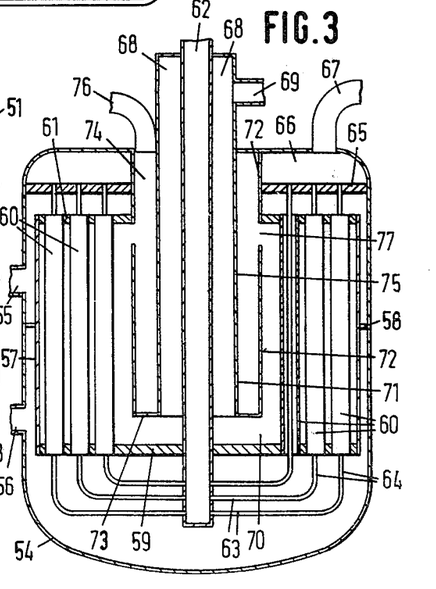
FIG. 3 is a representation of another embodiment of an integrated heat exchanger according to the invention provided with a bundle of straight pipes.

A different embodiment of an integrated intermediate heat exchanger and decay heat cooler is shown in FIG. 3. This representation too, as well as FIGS. 1 and 2, are only diagrammatical. The vessel 54 or the housing 54 of the component is provided with the supply line 55 and the discharge line 56 for primary cooling fluid. Within the vessel 54 there is arranged a second cylindrical vessel 57 which is shut off at the bottom by the tube plate 59 and at the top by the tube plate 61. Half-way the wall of the vessel 57 there is arranged an annular baffle 58 in the space between vessel 57 and vessel 54. The said space as a result is divided in a top portion and a bottom portion. The fluid supplied via supply line 55, from the top portion of the space, can only reach the lower part thereof via tubes 60 between the tube plate 61 and the tube plate 59. The cooling fluid of the decay heat cooler is supplied to the depicted component by the tube 62 extending centrally from the top to the bottom through the component. At the bottom of the component terminates a plurality of lines 63 in the central tube 62. Each of lines 63 communicate with tubes 64 which each extend concentrically through one of the tubes 60.

At the top of the component the tubes 64 terminate via a tube plate 65 in a torus-shaped collecting chamber 66, from which chamber there extends a discharge line 67 to outside the component.

The secondary cooling fluid of the intermediate heat exchanger is supplied in the installation shown via a supply line 69 communicating with a tube 68 having a larger diameter than the tube 62. Tube 68 is arranged concentrically around the tube 62 and projects in the interior of the component as far as a slight distance above the lower tube plate 59, and thence providing access to the space 70 around the tubes 60. The outer wall 71 of the tube 68 adjoins the inner wall of a tube 75 arranged concentrically thereabout, which constitutes the boundary of the chamber 74, from where the secondary fluid is discharged via the discharge line 76. The chamber 74 is bounded at the bottom by the annular baffle 73 and at the exterior by tube 72, which tube 72 constitutes likewise the inner wall of the space 70 around the tube 60. Between the tube 72 and the tube plate 61 there is provided an opening 77 by which the secondary cooling fluid of the intermediate heat exchanger, after having been conducted around the tube 60, enters the collecting chamber 74.

Figure 4:
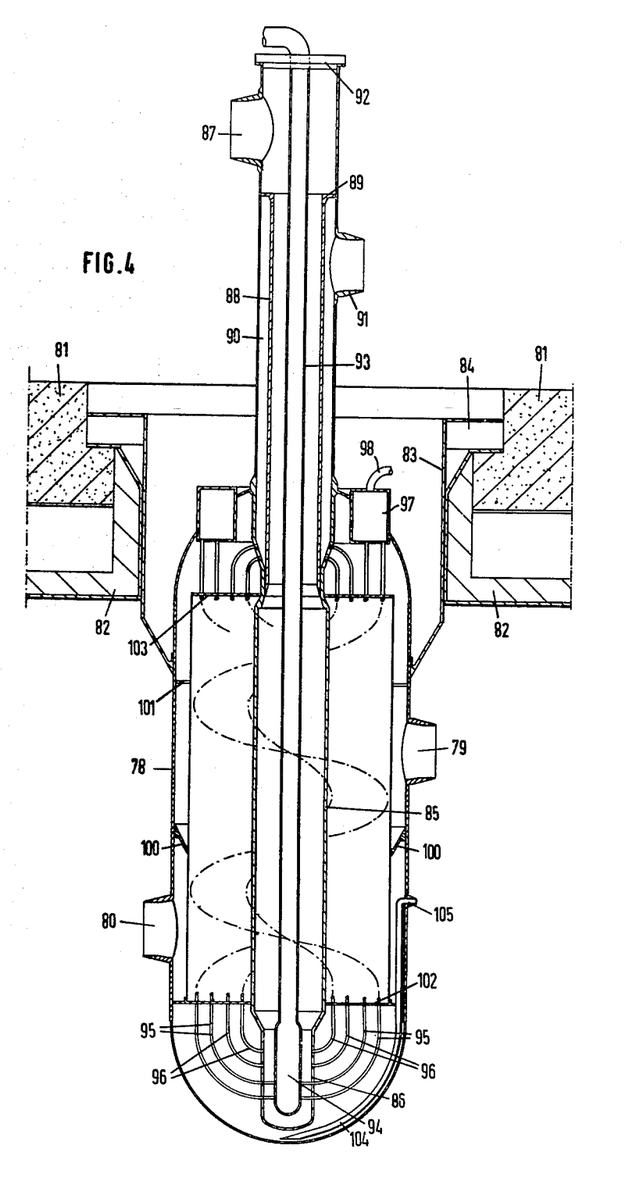
FIG. 4 is an embodiment of the integrated heat exchanger according to the invention with a helically wound bundle, and FIG. 5a, b and c represent a diagrammatic embodiment of the collecting chamber of a decay heat cooler integrated according to the invention in an intermdiate heat exchanger.

FIG. 4 shows a different embodiment of the integrated heat exchanger according to the invention. This embodiment comprises the cylindrical vessel 78, in the side wall of which there are provided a supply opening 79 for primary cooling fluid and a discharge opening 80 for primary cooling fluid. In the nuclear reactor installation according to the invention the heat exchanger shown is arranged in an opening in a concrete operation floor 81 protecting the operating personnel present on the floor from the lines for primary cooling fluid extending underneath the floor. The opening in the floor and the bottom of the floor are protected for instance by a steel supporting construction 82. The vessel 78 is suspended for instance in a steel substantially cylindrical shield 83 secured to the wall of the vessel, which shield is provided at the top with a collar 84 by means of which the shield rests on a recessed portion of the concrete floor 81. In order to give an impression of the possible dimensions, it is stated that the vessel itself may have a height of about 18 meters, while the distance from the bottom of the vessel as far as the top of the concrete floor may be about 20 metres.

In the vessel 78 projects a hollow tube 85 extending along the axis thereof, which extends to substantially the bottom of the vessel 78 and terminating at the bottom side in a collecting chamber 86. At the top side the tube 85 is provided with a supply opening 87 for feeding secondary cooling fluid. Within the tube 85 there is arranged a second hollow tube 88 over a part of the length thereof, at some distance from the inner wall of the tube 85 and concentrically with the tube 85. The lower end of the tube 88, adjacent the top end of the vessel 78, is sealingly attached to a locally constricted part of the tube 85, and at the top end of the tube 88 there is secured between the tube 88 and the tube 85 an annular plate 89. The arrangement is such that between the tubes 85 and 88 there is disposed a collecting chamber 90. In the tube 85 there is furthermore provided a discharge opening 91 for discharging secondary cooling fluid collected in the chamber 90. The top end of the tube 85 is shut off by the disk-shaped plate 92. Centrally through the plate 92, along the axis of the tube 85 and of the vessel 78, there extends a tube 93 having a smaller outer diameter than the inner diameter of the tubes 85 and 88. The tube 93 terminates at the bottom of the vessel 78 and in the collecting chamber 86 in a (smaller) collecting chamber 94. Through the tube 93 is conducted the cooling fluid from the decay heat cooler in the collecting chamber 94.

From the chamber 94 there extends a plurality of tubes 95, of which only a few are represented, in the chamber 86 and subsequently through the wall of the chamber 86 in the space at the bottom of the vessel 78. From chamber 86 there extends a plurality of tubes 96, of which only a few are depicted, in the space at the bottom of the vessel 78. The tubes 95 and 96, combined in a bundle, are helically wound around the tube 85, conducted upwardly in the vessel 78. In the top of the vessel 78 terminate the tubes 96 in the lower ends of the collector chamber 90 between the tubes 85 and 88. The tubes 95 terminate in a separate collecting chamber 97 arranged in the top end of the vessel 78, which chamber is provided with a discharge opening 98. The helical winding of the bundle of tubes 95 and 96 around the tube 85 is only diagrammatically shown in the drawing.

The entire bundle of tubes 95 and 96 is surrounded by a jacket 99 having a smaller outer diameter than the inner diameter of the vessel 78. Between jacket 99 and vessel 78 there is therefore provided a space that is divided by means of the baffle 100 in two parts. In the upper part of the space there is present the supply opening 79, while the discharge opening 80 is positioned in the lower part of the space. The upper part of the space is bounded by an annular plate 101 which is provided with a plurality of openings for passing the primary cooling fluid. The lower part of the space is bounded at the bottom side by a plate 102 comprising a plurality of openings. The plate 102 likewise adjoins the space within the jacket 99 at the bottom side. The space within the jacket 99 is bounded at the top by the apertured plate 103. The bundle of tubes 95 and 96 is conducted through the plate 102 and through the plate 103.

In operation primary cooling fluid flows in the space between the jacket 99 and the vessel 78 via supply opening 79, from where the fluid moves through the apertured plate 101 as far as into the space above the plate 103 around the lower ends of the collecting chambers 97 and 90 and the top ends of the tubes 95 and 96. Via the openings in the plate 103, the fluid subsequently moves around the tubes of the bundle, within the jacket 99 downwardly and via the openings in the plate 102 as far as into the space at the bottom of the vessel 78. Thence the fluid moves via the openings in the outer portion of the plate 102 as far as to the lower portion of the space between the jacket 99 and the vessel 78, from where fluid is discharged via the opening 80. Simultaneously secondary cooling fluid moves from the intermediate heat exchanger through the tube 85 into the chamber 86, via tubes 96 upwardly into the collecting chamber 90 from where it is discharged via opening 91 and/or cooling fluid moves from the decay heat cooler through the tube 93 into the chamber 94 and from there via tubes 95 upwardly into the collecting chamber 97, from where the fluid is discharged via opening 98.

Any accumulations of waste materials formed at the bottom of the vessel (impurities that precipitate in situ from the cooling fluid) can be exhausted from the installation via the line 104 which at 105 projects through the wall of the vessel 78. The line 104 furthermore serves for discharging the cooling fluid from the installation after operation.

Figure 5:
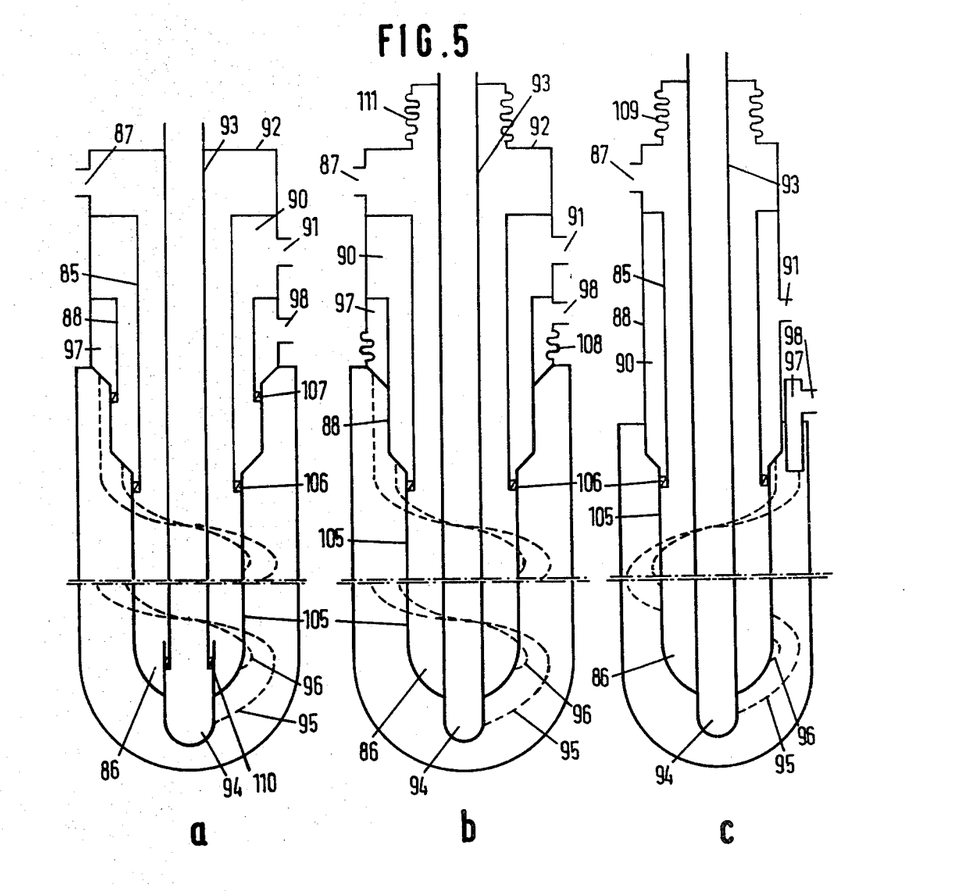

A number of arrangements are possible for the upper collecting chamber 97 shown in detail in FIG. 4. In FIGS. 5a, 5b and 5c some possibilities are shown. FIGS. 5a-5c show the installation according to FIG. 4 very diagrammatically. Identical parts are indicated by identical reference numerals. As shown in FIG. 5 it is possible that the collecting chamber 94 partly extends through the wall of the collecting chamber 86. The tubes 95 then project from the part of the chamber 94 situated outside the chamber 86, so that they need not be conducted separately through the wall of the chamber 86.

As shown, the line for supply of secondary cooling fluid of the intermediate heat exchanger may be composed of two tubular bodies: tube 85 and tube 105, whereby are provided for taking up thermal stresses, piston rings 106 between the lower end of the tube 85 and the top end of the tube 105.

In FIG. 5a the collecting chamber 97 is a torus-shaped collecting chamber around a part of the collecting chamber 90. Between the tube 88 and the lower outer wall of the chamber 97 there are provided piston rings 107 for taking up thermal expansion differences. For the same purpose piston rings 110 are provided between the tube 93 and the collecting chamber 94.

In FIG. 5b the collecting chamber 97 is likewise torus-shaped. The avoidance of thermal stresses is effected in the construction shown therein inter alia by means of the bellows-shaped outer wall 108 of the chamber 97, and the bellows 111 between the plate 92 and the tube 93.

In FIG. 5c the collecting chamber is a separate part in the top of the vessel 78. This construction is not symmetrical. Avoidance of thermal stresses is effected in the depicted construction inter alia by the bellows 109 at the top of the supply tube for secondary cooling fluid.

I claim:

1. A nuclear reactor installation comprising a housing containing a reactor core and provided with means for dissipating the heat generated in the reactor core during power operation, which means comprise at least one primary fluid circuit incorporating a pump and extending through the reactor core, and at least one secondary fluid circuit for heat utilization arranged outside the reactor housing to utilize the heat from said core, said secondary circuit incorporating a pump and coupled for heat transfer to said primary circuit by means of an intermediate heat exchanger; wherein said installation is provided with further means for dissipating the decay heat produced in the core of the nuclear reactor after the reactor operation has been switched off and the power shut down, said further means comprising a third fluid circuit arranged outside the reactor housing, and said third fluid circuit comprising a pump means, said third fluid circuit being coupled to the primary circuit by said intermediate heat exchanger, said intermediate heat exchanger being structurally integrated to comprise a single vessel housing containing conducting and heat transfer members respectively forming part of the secondary circuit and the third fluid circuit and arranged at substantially the same location in the flow path of the fluid in the primary circuit so that the said primary fluid flows substantially simultaneously over the conducting members of both the secondary utilization circuit and the third decay heat fluid circuit, and wherein said intermediate integrated heat exchanger situated outside of the reactor core comprises a vessel which accommodates the external portion of the primary circuit including the primary fluid containing the heat to be dissipated from the core during the power and decay phases of reactor operation and also accommodates heat exchange portions of said secondary fluid circuit and said third fluid circuit one of said portions forming a utilization circuit for absorbing the heat evolved during the power generation phase and the other of said portions forming a decay heat circuit for absorbing the heat generated during the decay phase; each of said circuits comprising a heat-transporting fluid, fluid distribution chambers, heat exchange tubes connected at the proximate ends of said chambers, fluid collectors connected to the distal ends of said tubes and to heat utilization or cooler means outside of the heat exchanger vessel; said tubes from each said portions being combined into a tube bundle in heat exchange contact with said primary fluid to remove the heat therefrom, said tubes in said bundle being disposed in parallel relationship to each other and arranged so that said tubes from said decay heat circuit are positioned at the outer portions of said bundle and the tubes from said utilization circuit form the inner portion of the bundle.

* * * * *

UNITED STATES PATENT OFFICE
CERTIFICATE OF CORRECTION

Patent No. 4,312,703          Dated January 26, 1982

Inventor(s) NICO WOUDSTRA

It is certified that error appears in the above-identified patent and that said Letters Patent are hereby corrected as shown below:

Under "[30] FOREIGN APPLICATION PRIORITY DATA" the complete number of the Netherlands application should read --7705332--.

Signed and Sealed this

Twentieth Day of July 1982

[SEAL]

Attest:

Attesting Officer

GERALD J. MOSSINGHOFF

Commissioner of Patents and Trademarks